US012600624B2

(12) United States Patent
Spanu et al.

(10) Patent No.: US 12,600,624 B2
(45) Date of Patent: Apr. 14, 2026

(54) MOLTEN SALTS REACTOR SYSTEMS FOR METHANE PYROLYSIS

(71) Applicant: SHELL OIL COMPANY, Houston, TX (US)

(72) Inventors: Leonardo Spanu, Houston, TX (US); Guoqiang Yang, Houston, TX (US); Joseph Broun Powell, Houston, TX (US); Carl Mesters, Houston, TX (US)

(73) Assignee: SHELL USA, INC., Houston, TX (US)

( * ) Notice: Subject to any disclaimer, the term of this patent is extended or adjusted under 35 U.S.C. 154(b) by 462 days.

(21) Appl. No.: 18/042,655

(22) PCT Filed: Sep. 15, 2021

(86) PCT No.: PCT/EP2021/075344
§ 371 (c)(1),
(2) Date: Feb. 23, 2023

(87) PCT Pub. No.: WO2022/058355
PCT Pub. Date: Mar. 24, 2022

(65) Prior Publication Data
US 2023/0348265 A1 Nov. 2, 2023

Related U.S. Application Data

(60) Provisional application No. 63/080,223, filed on Sep. 18, 2020.

(51) Int. Cl.
*C01B 3/26* (2006.01)
*C01B 32/05* (2017.01)

(52) U.S. Cl.
CPC ................ *C01B 3/26* (2013.01); *C01B 32/05* (2017.08); *C01B 2203/0277* (2013.01);
(Continued)

(58) Field of Classification Search
CPC ... C01B 3/26; C01B 32/05; C01B 2203/0277; C01B 2203/0805; C01B 2203/1011; C01B 2203/1241
(Continued)

(56) References Cited

U.S. PATENT DOCUMENTS 3,210,268 A  10/1965  Hendal et al.
10,941,130 B2 *  3/2021  Chung ..................... B01D 3/42
(Continued)

OTHER PUBLICATIONS

International Search Report and Written Opinion Received for PCT Patent Application No. PCT/EP2021/075344, Mailed on Jan. 7, 2022, 10 Pages.
(Continued)

*Primary Examiner* — Anthony J Zimmer
*Assistant Examiner* — Annette Phan
(74) *Attorney, Agent, or Firm* — SHELL USA, INC.

(57) ABSTRACT

A reactor system, which is active in pyrolyzing methane at effective conditions, comprising a molten salt medium and a reaction vessel, the molten salt being contained within the reaction vessel using various methods of catalyst distribution within the vessel such that when methane passes through the vessel, it comes into contact with said catalyst causing a pyrolysis reaction thereby producing molecular hydrogen with reduced carbon dioxide emissions. The catalyst may be placed within the reaction vessel either as suspended particles or in a structured packed form.

10 Claims, 2 Drawing Sheets

(52) U.S. Cl.
 CPC ................. *C01B 2203/0805* (2013.01); *C01B*
 *2203/1011* (2013.01); *C01B 2203/1241*
 (2013.01)

(58) Field of Classification Search
 USPC ........................................................ 423/651
 See application file for complete search history.

(56) References Cited

U.S. PATENT DOCUMENTS

2021/0061654 A1     3/2021   Mcfarland et al.
2021/0363013 A1    11/2021   Spanu et al.

OTHER PUBLICATIONS

Machhammer et al., "Financial and Ecological Evaluation of Hydrogen Production Processes on Large Scale", Chemical Engineering Technology, Feb. 10, 2016, vol. No. 39, Issue No. 6, pp. 1185-1193.
Kang et al., "Catalytic Methane Pyrolysis in Molten MnCl2—KCl", Applied Catalysis B: Environmental, Oct. 5, 2019, vol. No. 254, pp. 659-666.

* cited by examiner

MOLTEN SALTS REACTOR SYSTEMS FOR METHANE PYROLYSIS

CROSS REFERENCE TO RELATED APPLICATIONS

This is a National stage application of International Application No. PCT/EP2021/075344, filed 15 Sep. 2021, which claims priority of U.S. Provisional Application No. 63/080,223, filed 18 Sep. 2020 which is incorporated herein by reference in its entirety.

FIELD OF THE INVENTION

This invention relates to a reactor system and related processes for carrying out chemical reactions, the system comprising at least one reactor containing a catalyst. More specifically, the invention concerns methane pyrolysis by molten salt reactor systems.

BACKGROUND OF THE INVENTION

The reforming of methane, lighter hydrocarbons, or coal is a common process to produce hydrogen at scale. While such methods are highly optimized and understood in the industry, they are associated with carbon dioxide production. Alternatively, pyrolysis of methane or lighter hydrocarbons is another approach to produce hydrogen, with the potential to result in reduced carbon dioxide emissions when compared to traditional methods of methane reforming. In a pyrolysis process the hydrocarbon molecules are converted into gaseous hydrogen and solid carbon via an endothermic reaction, without the formation of carbon dioxide as a reaction product. Major challenges of a methane pyrolysis process include the deposition of coke in undesirable portions of the reactor and input of the heat in the reaction zone. Novel and efficient solutions for facilitating methane pyrolysis are needed.

Molten salt is a well-known medium for carrying out endothermic reactions such as the cracking of hydrocarbons at high temperature. See U.S. Pat. No. 3,210,268. Pyrolysis of methane or natural gas into carbon and hydrogen is particularly suited for molten salt reactors. In such reactors the molten salt liquid acts as a heat transfer medium while preventing the deposition of carbon species on the undesirable portions of the reactor such as the walls and elements inside the reactor. Without the presence of the molten salt, coke deposits must be removed periodically via other means, such as oxidation of the carbon by exposure to steam or air. Such practice additionally generates carbon dioxide emissions, thereby undercutting one of the main drivers behind the use of methane pyrolysis. A pyrolytic process for natural gas produces hydrogen with reduced carbon dioxide emissions, compared to hydrocarbons reforming or coal gasification. See "Financial and Ecological Evaluation of Hydrogen Production Processes on Large Scale," Otto Machhammer et al., Chem. Eng. Technol. 39, No. 6, 1185-93 (2016).

According to known reactor systems, mixtures of halide salts, and chlorides particularly, of the alkaline and alkaline earth metals (e.g. sodium chloride, potassium chloride, etc.) can serve as a heat transfer medium for high temperature reactions (600-1000° C.) while being chemically stable at high temperature and against reactions with the natural gas feedstock and pyrolysis products. According to these known systems, catalytic activity toward methane activation is limited in alkali chloride salts, thereby requiring high reaction temperature (T>900° C.) to reach the desirable methane conversion levels. See "Catalytic Methane Pyrolysis in Molten $MnCl_2$—KCl," Dohyung Kang et al., Applied Catalysis B: Environmental, Volume 254, 659-666 (2019). Achieving high methane conversion at temperature lower than 1000° C. would increase the overall energy efficiency of the process and mitigate challenges related to materials of construction typically present in high temperature processes. The dispersion of a catalytic material (metal particles and/or supported metal particles) in the molten salts may promote the cracking of methane at lower temperature, while allowing a control of solid carbon morphology. See PCT App. No. WO2019/197256A1. A molten salt based catalytic system could combine therefore the heat transfer and anti-fouling advantages of a simple molten salt or salt mixture (e.g. sodium chloride or sodium chloride and potassium chloride mixture) with the improved activity of solid catalyst.

Known design options based on bubble column reactors are already available if the products are liquid or in gaseous form. For example, current designs for packed bubble column reactors and slurry bubble column reactors are limited to instances where the products are in liquid or gaseous form.

Concerning conventional packed bubble column reactors, the catalyst particles are typically in mm size range and are confined in a section of the reactor at fixed position. Such system suffers from plugging risks due to produced carbon particles trapped in the inter-catalyst particle space. Over time, the catalyst particle bed behaves like a deep-bed filter and carbon particles formed during methane pyrolysis accumulated in the void space between catalyst particles.

Another type of conventional reactor for handling multiphase reaction system is slurry bubble column reactor. In slurry bubble column reactors, the circulation of catalyst particles typically in smaller size range such as hundred microns within the liquid prevents carbon particles from plugging inside the reactor. For example, the system described in WO2019197256A1 comprises a reactor containing a molten salt medium having dispersed therein one or more catalytically active metals having particle sizes that vary from 1 nm to 0.5 mm., more preferably between 1 nm and 15 nm. Such design, however, makes the separation of the catalyst from the carbon particles particularly challenging, since both carbon product particles and solid catalyst particles are mixed in the reactor. Furthermore, solid catalyst particles in the nanoscale range tend to form agglomerate, thereby resulting in poor contact with the reactant gas and loss of catalytic surface area.

Because of the solid nature of the carbon product, new reactor concepts are required in a methane pyrolysis process.

SUMMARY OF THE INVENTION

It has been found that a new molten salt reactor system for performing the pyrolytic process of methane or natural gas will produce molecular hydrogen with reduced carbon dioxide emissions. During the pyrolysis reaction, the novel reactor housing the molten salt catalytic system contains of four different phases: methane or natural gas as a feedstock and gaseous products from the reaction, the liquid molten salt, a solid catalyst, and solid carbon products. The design of the reactor is important to properly manage all the four phases. The reactor and process conditions allow for an improved gas-solid catalyst contact, with adequate ratio between mass of the gas and gas bubble surface area for heat transfer. The carbon products are continuously removed from the reactor with minimal loss of the liquid phase and the solid catalyst.

In some embodiments, a process for methane pyrolysis in a molten salt medium, comprises exposing the methane gas to a molten salt medium and a solid catalyst in a volume of a reaction vessel under effective conditions to convert at least a portion of methane into hydrogen and solid carbon, and removing at least a portion of the solid carbon. The molten salt medium may comprise halide salts and chloride salts in particular. The solid catalyst may be placed in the reaction vessel either as suspended particles in the molten salt medium or in a structured packed form.

In some embodiments, a reactor system for carrying out chemical reactions comprises one or more hydrocarbon feed lines fed into one or more reactor sections containing a molten salt and a solid catalyst wherein the solid catalyst is placed in the reactor either as suspended particles in the molten salt or in structured packed form wherein the one or more reactor sections comprise a lower section of the reaction vessel and an upper section of the reaction vessel.

In some embodiments, the reactor systems described herein further comprise suspended catalyst particles that are confined in the lower section of the reaction vessel such that the catalyst particles can move freely within the lower section of the reaction vessel. In some embodiments, the reactor is configured to perform a pyrolysis reaction resulting in the production of solid carbon particles by bubbling a hydrocarbon feed through the molten salt such that hydrocarbon bubbles come into contact with the suspended catalyst particles. In some embodiments, the reactor is further configured to allow the solid carbon particles produced by the pyrolysis reaction to move upwards with the motion of the bubbles and flow of molten salt and accumulate in a carbon rich layer located in the upper section of the reaction vessel.

In some embodiments, the reactor systems described herein include catalyst particles in the lower section of the reaction vessel having a density of about 1,500 kg/m$^3$ to about 3,800 kg/m$^3$. In other embodiments, the catalyst density is about 2,000 kg/m$^3$ to about 2,500 kg/m$^3$. In some embodiments, the catalyst particles have an average size of about 0.6 mm to about 6 mm in diameter. In some embodiments, the flux of the hydrocarbon feed is between about 0.7 kg/m$^2$/min to about 20 kg/m$^2$/min.

In some embodiments, the reactor systems described herein further comprising a pump located external to the reaction vessel wherein the molten salt circulates to and from a reservoir tank in fluid connection with the reactor vessel, and wherein the pump drives the circulation of the molten salt and controls the flux of the molten salt circulation. In some embodiments, the flux of the molten salt circulation is between about 5 kg/m$^2$/s to about 130 kg/m$^2$/s.

In some embodiments, the reactor systems described herein have hydrocarbon and molten salt fluxes that, in combination, result in gas bubbles that facilitate a pyrolysis reaction thereby generating solid carbon particles and further facilitates separation of the produced carbon particles from the suspended catalyst when the gas bubbles travel from the lower section of the reaction vessel to the upper section of the reactor.

In some embodiments, the reactor systems described herein include a solid catalyst placed in the reactor vessel in structured packed form wherein the structured packed form has a void volume of about 90% to about 99%.

In some embodiments, a multiphase reactor comprises a vessel comprising a reaction zone, a separation zone, and a gas disengagement zone. An input of feed gas is in fluid connection with the reaction zone and the reaction zone is in fluid connection with the separation zone. In some embodiments, the reactor described herein further comprises a carbon rich layer positioned between the separation zone and the gas disengagement zone. In some embodiments, the reaction zone contains a molten salt medium and a suspended catalyst and is further configured to allow a pyrolysis reaction to take place within the reaction zone. In some embodiments, a portion of the output products from the pyrolysis reaction is in gas phase and a portion of the output products is in slurry phase. The gas portion of the output products passes through a demister to remove molten salt droplets and exits the vessel via a primary outlet connection. In some embodiments, the carbon rich layer is positioned on top of the separation zone and contains a stream of molten salt medium and carbon which exits the vessel via a secondary outlet connection.

In some embodiments, the reactors systems disclosed herein further comprise a molten salt reservoir tank in fluid connection with a sump pump tank wherein the sump pump tank is in fluid connection with the reactor and is configured to pump the material within the sump pump tank into the reactor.

In some embodiments, a process for reacting a gaseous mix reactant comprises at least one hydrocarbon in a molten salt reactor system to form products comprising hydrogen, said process comprises passing said gaseous mix through at least one reactor vessel containing molten salt wherein a catalyst is suspended within the molten salt, contacting the gaseous mix reactant with the suspended catalyst as the gaseous mix reactant rises through the at least one reactor vessel thereby producing output products comprising at least hydrogen and carbon via pyrolysis, and separating the output products to produce at least a concentrated carbon stream and a hydrogen stream comprising at least 95% hydrogen by weight. In some embodiments, the gaseous mix reactant may be blended with renewable natural gas.

In some embodiments, a reactor comprises a vessel comprising a structured packed catalyst and an input of feed gas in fluid connection with the vessel through a gas sparger wherein the structured packed catalyst further comprises catalytic surface. In some embodiments, the sparger is configured to generate bubbles of feed gas distributed substantially evenly across a cross section of the vessel. In some embodiments, the vessel is configured to circulate the feed gas through the structured packed catalyst thereby causing a pyrolysis reaction to occur as the feed gas contacts with the catalyst thereby producing output products comprising at least hydrogen and carbon. In some embodiments, the structured packed catalyst has a void volume of about 90% to about 99% or about 97% to about 99%. In some embodiments, the feed gas flow per unit cross sectional area per time can be in a range of about 1 kg/m$^2$/min to about 25 kg/m$^2$/min, or about 5 kg/m$^2$/min to about 15 kg/m$^2$/min.

In some embodiments, the reactor systems disclosed herein further comprise a three phase separation unit in fluid connection with the reactor via a main outlet wherein the three phases separation unit is configured to separate gas and solid phase material into a gas/solids separation unit, recycled molten salt medium into the reactor via a recirculation line, and a carbon stream into a carbon filtration vessel via a carbon stream feed. In some embodiments, the reactor systems further comprise a molten salt reservoir tank in fluid connection with the reactor that is configured to receive molten salt medium from the reactor via a reactor drain line. In some embodiments, the reactor systems further comprise a sump pump tank in fluid connection with the molten salt reservoir tank via a transferring line, wherein the sump pump tank is configured to pump molten salt into the reactor via the recirculation line.

In some embodiments, a process for reacting a gaseous mix reactant comprising at least one hydrocarbon in a gas lift reactor system to form a gaseous product comprising hydrogen comprises passing said gaseous mix through at least one reactor vessel containing a structured packed catalyst, contacting the gaseous mix reactant with the packed catalyst as the gaseous mix reactant rises through the at least one reactor vessel thereby producing output products comprising at least hydrogen, hydrocarbons, and carbon via pyrolysis, and separating the output products to produce at least a concentrated carbon stream and a hydrogen/hydrocarbon stream. In some embodiments the gaseous mix reactant comprises methane or natural gas. In some embodiments, the gaseous mix reactant comprises renewable natural gas.

In some embodiments, a process for the preparation of hydrogen by reaction of hydrocarbon in the presence of a catalyst is described wherein the process is performed in a reactor system comprising one or more hydrocarbon feed lines fed into one or more reactor sections containing a structured packed catalyst.

The features and advantages of the invention will be apparent to those skilled in the art. While numerous changes may be made by those skilled in the art, such changes are within the spirit of the invention.

BRIEF DESCRIPTION OF THE DRAWINGS

A more particular description of the invention, briefly summarized above, may be had by reference to the embodiments thereof which are illustrated in the appended drawings and described herein. It is to be noted, however, that the appended drawings illustrate only some embodiments of the invention and therefore not to be considered limited of its scope for the invention may admit to other equally effective embodiments.

DETAILED DESCRIPTION OF THE INVENTION

Figure 1:
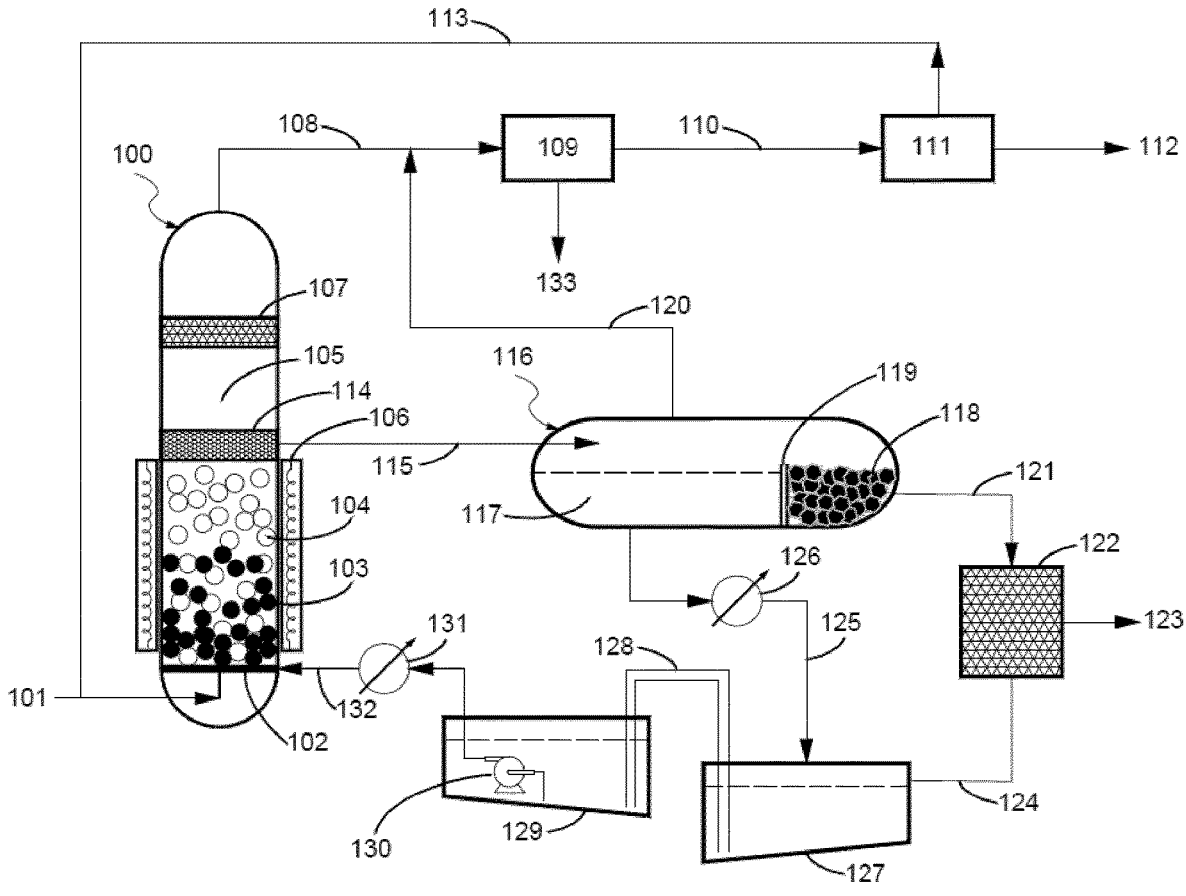
FIG. 1 is a schematic diagram of one embodiment of a suspended catalyst molten salt reactor system.

FIG. 1 is an exemplary schematic diagram of a molten salt pyrolysis reactor system. According to at least one embodiment, the system includes a reactor vessel 100, containing at least three zones: a bottom reaction zone 103 with catalyst, a middle catalyst/carbon separation zone 104, and a top gas disengagement zone 105. Effective conditions for the reactor temperature can be in a range of 600° C. to 1000° C., or 850° C. to 950° C. The reactor pressure can be in a range of 1 bara to 10 bara, or 5 bara to 10 bara. According to some embodiments of the invention, the catalyst is a solid catalyst. According to some embodiments, the solid catalyst is suspended in a molten salt medium.

According to at least one embodiment, the systems described herein are capable of facilitating high temperature catalytic methane pyrolysis using a molten salt which melts below 1000° C. In some embodiments, the molten salt is stable under methane pyrolysis reaction conditions at temperatures above 700° C., preferably about 700° to about 1050° C. In some embodiments, the molten salt is present in the reaction zone at a temperature above its melting point. To function as an effective carrier for a suspended catalyst it is essential that the molten salt be thermally and chemically stable under pyrolytic reaction conditions. That is, the molten salt cannot be reduced by the reactant feed mixture under the conditions prevailing in the reaction zone.

According to at least one embodiment of the present invention, the system includes a conduit 101 to supply feed gas (natural gas or methane) to the reactor vessel 100 through a gas sparger 102. The function of the sparger is to distribute the methane or natural gas evenly across the reactor cross-section, and facilitate the generation of small bubbles of the feed gas in the molten salt medium which promote effective contact between the feed gas and catalyst. The feed gas may comprise a mix of methane, hydrogen and other lighter hydrocarbons. In some embodiments, methane is the component with the largest volume fraction. In some embodiments, hydrogen is the component with the largest volume fraction. According to at least one embodiment, a fraction of hydrogen is present in the feed at varying amounts (but not limited) between 1-35 wt %. The feed gas enters the reactor vessel from either the bottom of the vessel or the top of the vessel via a downward conduit. The embodiment depicted in FIG. 1 shows the bottom entry configuration, but a top entry configuration is also feasible. According to an embodiment, the sparger can be any conventional sparger design that can withstand the reaction conditions described herein. The pyrolysis reaction mainly takes place in the bottom zone of the reactor 103. Small bubbles of methane generated from the sparger rise through molten salt medium and contact with suspended catalyst particles. The resulting pyrolysis reaction occurs at the contact surface between bubbles and catalytic sites thereby producing at least both hydrogen and elemental carbon from the conversion of methane. Elemental carbon particles resulting from the conversion of methane either move freely in the void space between suspended catalysts or attach to bubbles and move upward through the carbon/catalyst separation zone 104 to the top liquid surface of the reactor.

Unlike prior art systems using finely divided, nanoscale metal and/or metal-oxide catalysts dispersed in a molten medium, some embodiments of the present invention include a suspended catalyst. According to at least one embodiment, catalyst particles are suspended in such a way to have enough void space to allow the produced solid carbon to move out of the catalyst bed and thus prevent plugging in the catalyst bed. The flow conditions (gas and molten salt flow rates) and catalyst properties (particle size and density) are optimized to suspend the catalyst and to prevent entrainment of catalyst out of the reactor. The catalyst density can be in a range of about 1,500 kg/m³ to about 3,800 kg/m³, or about 2,000 kg/m³ to about 2,500 kg/m³. The particle size of catalyst can range from about 0.6 mm to about 6 mm, or about 0.8 mm to about 4 mm. Due to the size of the suspended catalyst, agglomeration of the catalyst is reduced when compared with prior art systems incorporating smaller, nanoscale catalyst particles. The methane feed per unit cross sectional area per time can be in a range of about 0.7 kg/m²/min to about 20 kg/m²/min, or about 1.4 kg/m²/min to about 5 kg/m²/min. The molten salt circulation flux can be in a range of about 5 kg/m²/s to about 130 kg/m²/s, or about 35 kg/m²/s to about 75 kg/m²/s.

The bottom reaction zone 103 produces a solid carbon product and a gas stream comprising hydrogen. The gas stream may comprise at least 50 vol % hydrogen, preferably at least 75 vol % hydrogen and more preferably at least 90 vol % hydrogen. In this bottom reaction zone, carbon dioxide is not formed, so there is no need to separate carbon dioxide from the hydrogen before it can be used in other processes. In addition to hydrogen in the gas stream, any unreacted methane will not negatively impact most downstream processes, including ammonia synthesis. This provides an advantage over other hydrogen production processes, for example, steam methane reforming which does produce carbon dioxide.

A gas phase stream including product hydrogen and unconverted methane passes through a gas disengagement zone 105 in the top of the reactor. In some embodiments, the gas disengagement zone in the top of the reactor is designed for initial separation between gas phase and entrained molten salt liquid droplets and carbon particles. In some embodiments, it is designed with the expanded section to reduce gas velocity in the section, therefore enhancing settling of liquid droplets and particles. In some embodiments, the gas disengagement zone contains a demister 107 to remove molten salt droplets in the gas stream. Then the gas stream exits the reactor from the top and enters a gas-solids separation unit 109 to remove entrained carbon particles. The gas-solids separator can be any conventional design that can handle the reaction conditions especially high temperature operation. The examples include cyclones, filters and combination of both. After exiting the separation unit, the gas without particles and molten salt droplets enters a gas separation and purification unit 111 to separate product hydrogen from unconverted methane. A stream of unconverted methane 113 is fed back into the reactor through feed entry conduit 101. The hydrogen produced from the reactor 112 can be the final product or used in the process as fuel gas to provide heat source for the reactor.

In the reactor vessel 100, a secondary heating source 106 can be placed either internally or externally to provide heat for molten salt system and to adjust reactor temperature. FIG. 1 depicts one possible embodiment including an external configuration of the secondary heating source 106. A person of skill in the art would understand other configurations and positions of the secondary heating source are feasible. In some embodiments, the heater can be electrical type heater made from the materials that can withstand high temperature. Examples include ceramic heaters or heaters made from special high temperature alloys. In some embodiments, the heater can also be combustion type heater using hydrogen produced from the process as fuel gas.

According to at least one embodiment, the elemental carbon produced from the conversion of methane can move upward with motion of gas bubbles and molten salt liquid and accumulate in a carbon rich layer at the top of reactor 114. The solid carbon product in the molten salt has lower settling characteristics, so the solid carbon product stays in the carbon rich layer making separation easier. The solid carbon product can be used as a raw material to produce color pigments, fibers, foil, cables, activated carbon or tires. In addition, the solid carbon product may be mixed with other materials to modify the mechanical, thermal, and/or electric properties of those materials. The final carbon morphology of the solid carbon product is controlled by the selection of the salts, metal-containing catalyst, and reaction conditions. According to some embodiments, the carbon rich layer comprises a region close to the top surface of molten salts where carbon particles formed during the pyrolysis process accumulate due to a combination of buoyancy force and lift from the gas. According to at least one embodiment, portions of the carbon contained in carbon rich layer at the top of the reactor vessel 114 can be withdrawn from the reactor through circulating flow of molten salt liquid, and this stream 115 enters a gas-liquid-solids three-phase separation vessel 116. A person of skill in the art would understand that other methods of withdrawing carbon contained in the carbon rich layer are feasible, including, for example, the use of a skimmer pump or conveyor mechanism. In the gas-liquid-solids three-phase separator, separated gas 120 is fed into the gas-solids separation unit 109, and molten salt liquid stays in one side of the separation unit 117. Solid carbon flows over the overflow weir in the separator 119 and accumulates in the other side of the separator 118. The carbon rich zone in the separator 118 still contains a small amount of molten salt liquid, and it can be withdrawn into a high temperature filtration vessel 122 to recover carbon product 123. According to at least one embodiment, the filtration vessel facilitates the physical process of separating carbon particles from the molten salt by passing the carbon-molten salt slurry through a filter medium that will not let the carbon particles pass through. The molten salt liquid entrained in the carbon particles is returned to the molten salt reservoir tank 127. The molten salt rich zone 117 in the separator may still contain some fine carbon particles, and it can be drained into the molten salt reservoir tank 127 after passing through a heat exchange 126 to cool down to the operating temperature of the reservoir tank. According to some embodiments, a heat exchanger 126 is optionally included depending on operating temperature for molten salt reservoir tank 127 and pump 130. According to some embodiments, the heat exchanger is a particular form of a cooling device that reduces the temperature of the molten salt medium. The molten salt reservoir tank may be any vessel capable of containing the molten salts. According to some embodiments, the internal walls of the vessel are lined with refractory materials that are resistant against salts corrosion. Molten salt liquid in the reservoir tank 127 can be transferred into the pump sump tank 129 through a conduit 128 based on pressure difference between the two tanks. Both tanks may be designed with self-draining capability such as uneven bottom design. A high temperature molten salt pump 130 submersed in the pump sump tank 129 is used to circulate molten salt back to the reactor bottom. The self-draining capability can be helpful when performing maintenance on the tanks and the pump contained therein. A primary heating device 131 is used to heat up the circulating molten salt stream to reach target reactor temperature. According to embodiments, the heating device is a heat exchanger. In an alternate configuration the pump 130 can be submersed in the reservoir tank 127, thereby eliminating the need for a second tank.

Figure 2:
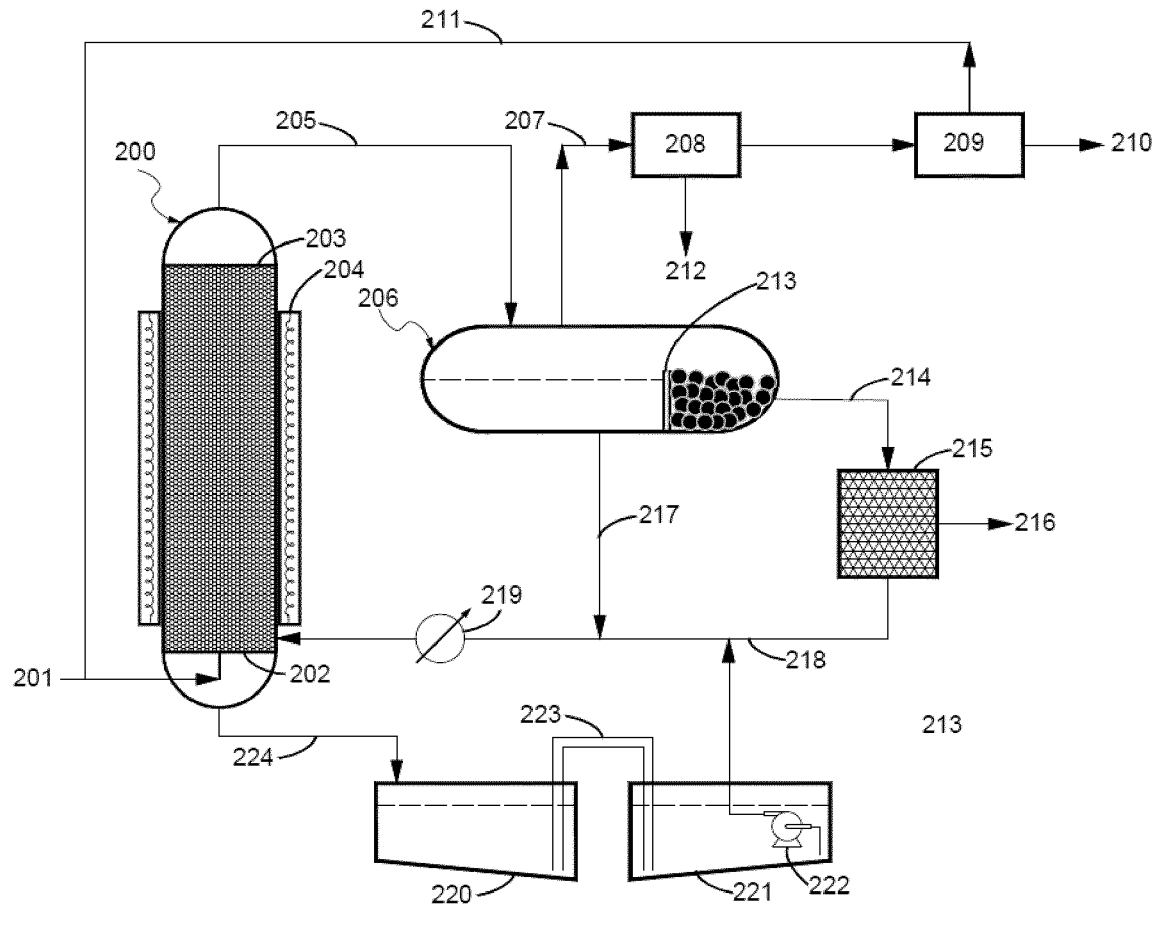
FIG. 2 is a schematic diagram of one embodiment of a structured packed catalyst gas lift reactor system.

FIG. 2 is an exemplary schematic diagram of a structured packed catalyst gas lift reactor system. According to at least one embodiment of the present invention, the system includes a reactor vessel 200, which contains structured packed catalyst 203 for conversion of methane. A person of skill in the art would understand that the term structured packed catalyst can refer to structured packing comprising catalytic material and configured to allow the flow of reactant material through the packing such that such reactant material comes into contact with said catalytic material thereby causing a reaction resulting in certain product materials being produced.

According to at least one embodiment of the present invention, the structured packed catalyst is made from the metal elements that have catalytic activity for conversion of methane. According to some embodiments, the structured packed catalyst has high void volume to reduce the flow resistance in the reactor and help improve molten salt circulation rate. The void volume of the packed catalyst can vary in the range of about 90% to 99%, or about 97% to 99%. Natural gas or methane feed 201 together with recycled methane 211 enter the reactor vessel from either the bottom of the vessel or the top of the vessel via a downward conduit. A gas sparger 202 is used to generate small bubbles and distributed gas evenly across the cross section of the reactor vessel. According to an embodiment, the sparger can be any conventional sparger design that can withstand the reaction conditions described herein. Methane gas flows through the structured packed catalyst in the form of bubbles within the molten salt. The presence of gas bubbles in the reactor creates hydrostatic pressure difference between the reactor 200 and the recirculation loop that include a three-phase separator 206, recirculation conduit 217 and a primary heat exchanger 219. This hydrostatic pressure difference generates circulation of molten salt liquid through the reactor and recirculation loop, which is referred as gas lift herein. The high void volume of the structured packed catalyst provides improved contact between the methane and the catalytic material and further facilitates movement of carbon out of the reaction zone such that carbon fouling is significantly minimized, a problem encountered in prior art reactor designs. The structured packed catalyst provides a low pressure drop in the reactor which helps in maintaining circulation of the molten salt within the reactor. According to some embodiments, circulation of molten salt is created from bubbling action and gas lift in the reactor. The actual circulation flux that can be achieved depends on reactor and recirculation loop configuration, methane feed rate, flow resistance from the structured packed catalyst, and reactor operating conditions. According to some embodiments, the reactor system may optionally include a pump to facilitate circulation within the reactor either in combination with the bubble lift forces of the reactors disclosed herein, or as a standalone circulation mechanism. According to some embodiments, the methane feed per unit cross sectional area per time can be in a range of about 1 $kg/m^2/min$ to about 25 $kg/m^2/min$, or about 5 $kg/m^2/min$ to about 15 $kg/m^2/min$.

According to at least one embodiment, other components described herein may be used in combination with a reactor comprising a structured packed catalyst design including three-phase separation unit 206, gas-solids separation unit 208, gas separation and purification unit 209, high temperature carbon filtration unit 215, primary heat exchanger 219, and secondary heating source to the reactor 204. According to some embodiments, a molten salt reservoir tank 220 and a pump sump tank 221 together with a molten salt pump 222 is also used in this concept for molten salt charging or draining, reactor maintenance, molten salt storage and melting, and optionally enhancing circulation of molten salt in the reactor loop. In some embodiments. the molten salt pump 222 may be operated at relatively lower temperature at least above the melting temperature of the molten salt blend. For example, for a system operating with a molten salt blend having a melting temperature of 660° C., the molten salt pump may be operated at temperatures above about 700° C. to minimize the molten salt solidification risk. Preferably, the molten salt pump can be operated at temperatures about 50-100° C. above the melting temperature of the molten salt blend. In some embodiments, the gas lift reactor may comprise a gas disengagement section at the top of the reactor and a portion of gas stream may exit the reactor from the top and enter the gas-solids separation unit 208. The other portion of gas stream together with carbon and molten salt liquid may exit the reactor from the side of the reactor and enter the three-phase separation unit 206.

10

We claim:

1. A process for methane pyrolysis in a molten salt medium, comprising:
   exposing methane gas to a molten salt medium and a solid catalyst in a volume of a reaction vessel under effective conditions to convert at least a portion of methane into hydrogen and solid carbon; and
   removing at least a portion of the solid carbon;
   wherein the molten salt medium comprises halide salts; and
   wherein the solid catalyst is placed in the reaction vessel either as suspended particles in the molten salt medium or in a structured packed form; and
   wherein the catalyst particles have a density of about 1500 $kg/m^3$ to about 3800 $kg/m^3$ and an average size of about 0.6 mm to about 6 mm in diameter.

2. A reactor system for carrying out methane pyrolysis in a molten salt medium, the reactor system comprising one or more hydrocarbon feed lines fed into one or more reactor sections containing a molten salt comprising halide salts and a solid catalyst wherein the solid catalyst is placed in the reactor either as suspended particles in the molten salt or in structured packed form wherein the one or more reactor sections comprise a lower section of the reaction vessel and an upper section of the reaction vessel,
   wherein the catalyst particles have a density of about 1500 $kg/m^3$ to about 3800 $kg/m^3$ and an average size of about 0.6 mm to about 6 mm in diameter.

3. The reactor system of claim 2, wherein the solid catalyst is placed in the reactor as suspended particles in the molten salt.

4. The reactor system according to claim 3,
   wherein the suspended catalyst particles are confined in the lower section of the reaction vessel such that the catalyst particles can move freely within the lower section of the reaction vessel;
   wherein the reactor is configured to perform a pyrolysis reaction resulting in the production of solid carbon particles by bubbling methane gas through the molten salt such that methane bubbles come into contact with the suspended catalyst particles;
   wherein the reactor is further configured to allow the solid carbon particles produced by the pyrolysis reaction to move upwards with motion of the bubbles and flow of molten salt and accumulate in a carbon rich layer located in the upper section of the reaction vessel.

5. The reactor system of claim 4, wherein the reactor is configured to allow a flux of methane feed of is-between about 0.7 $kg/m^2/min$ to about 20 $kg/m^2/min$.

6. The reactor system of claim 3, further comprising a pump located external to the reaction vessel; and
   wherein the molten salt circulates to and from a reservoir tank in fluid connection with the reactor vessel; and
   wherein the pump drives the circulation of the molten salt and controls a flux of the molten salt circulation.

7. The reactor system of claim 6, wherein the reactor is configured to allow the flux of the molten salt circulation of is between about 5 $kg/m^2/s$ to about 130 $kg/m^2/s$.

8. The reactor system of claim 3, wherein the reactor is configured to allow methane feed and molten salt fluxes in combination to result in gas bubbles that facilitates a pyrolysis reaction thereby generating solid carbon particles and further facilitates separation of the produced carbon particles from the suspended catalyst when the gas bubbles travel from the lower section of the reaction vessel to the upper section of the reactor.

9. The reactor system of claim 2, wherein the solid catalyst is placed in the reactor vessel in structured packed form.

10. The reactor system of claim 9, wherein the solid catalyst placed in the reactor vessel in structured packed form has a void volume of about 90% to about 99%.

* * * * *